US012592480B2

(12) United States Patent
Shoji et al.

(10) Patent No.: US 12,592,480 B2
(45) Date of Patent: Mar. 31, 2026

(54) VEHICLE ANTENNA DEVICE AND ANTENNA MODULE

(71) Applicant: AGC Inc., Tokyo (JP)

(72) Inventors: Hideaki Shoji, Tokyo (JP); Satoshi Kaneko, Tokyo (JP)

(73) Assignee: AGC INC., Tokyo (JP)

( * ) Notice: Subject to any disclaimer, the term of this patent is extended or adjusted under 35 U.S.C. 154(b) by 89 days.

(21) Appl. No.: 18/799,844

(22) Filed: Aug. 9, 2024

(65) Prior Publication Data

US 2024/0405412 A1 Dec. 5, 2024

Related U.S. Application Data

(63) Continuation of application No. PCT/JP2023/003811, filed on Feb. 6, 2023.

(30) Foreign Application Priority Data

Feb. 10, 2022 (JP) ................................ 2022-019909

(51) Int. Cl.
*H01Q 1/32* (2006.01)
*H01Q 1/02* (2006.01)
(Continued)

(52) U.S. Cl.
CPC ............. *H01Q 1/3291* (2013.01); *H01Q 1/02* (2013.01); *H01Q 1/1271* (2013.01); *H01Q 9/0414* (2013.01)

(58) Field of Classification Search
CPC .. H01Q 1/3291; H01Q 1/1271; H01Q 1/3275; H01Q 1/32; H01Q 21/28
See application file for complete search history.

(56) References Cited

U.S. PATENT DOCUMENTS

| | | | | |
|---|---|---|---|---|
| 11,404,792 | B2 | 8/2022 | Tanaka | |
| 11,688,954 | B2 * | 6/2023 | Yong | H01Q 1/38 343/702 |

(Continued)

FOREIGN PATENT DOCUMENTS

| | | | |
|---|---|---|---|
| CN | 112803175 A | | 5/2021 |
| JP | 2018-067881 A | | 4/2018 |
| JP | 2020174249 | * | 10/2020 |

OTHER PUBLICATIONS

International Searching Authority, "International Search Report," issued in connection with International Patent Application No. PCT/JP2023/003811, dated Apr. 18, 2023.

(Continued)

*Primary Examiner* — Awat M Salih
(74) *Attorney, Agent, or Firm* — Foley & Lardner LLP

(57) ABSTRACT

To provide a vehicle antenna device which can secure desired antenna characteristics of both a satellite antenna and a communication antenna. A vehicle antenna device comprising a dielectric attached to a vehicle, a conductor plate placed adjacent to the dielectric plate, a satellite antenna disposed below the conductor plate, receiving radio waves which arrive from a satellite through the dielectric plate, and a communication antenna disposed below the satellite antenna, transmitting/receiving radio waves to/from outside the vehicle through the dielectric plate in a horizontal direction, wherein the satellite antenna comprises a radiating conductor which does not overlap the conductor plate from a vertical view, and a ground conductor positioned between the radiating conductor and the communication antenna.

20 Claims, 7 Drawing Sheets

(51) Int. Cl.
*H01Q 1/12* (2006.01)
*H01Q 9/04* (2006.01)

(56) References Cited

U.S. PATENT DOCUMENTS

| | | | | |
|---|---|---|---|---|
| 2018/0175492 | A1* | 6/2018 | Sasaki | H01Q 1/3208 |
| 2020/0058988 | A1 | 2/2020 | Elshaar | |
| 2024/0047879 | A1* | 2/2024 | Nozaki | H01Q 19/22 |

OTHER PUBLICATIONS

International Searching Authority, "Written Opinion," issued in connection with International Patent Application No. PCT/JP2023/003811, dated Apr. 18, 2023.

* cited by examiner

VEHICLE ANTENNA DEVICE AND ANTENNA MODULE

This application is a continuation of PCT Application No. PCT/JP2023/003811, filed on Feb. 6, 2023, which is based upon and claims the benefit of priority from Japanese Patent Application 2022-019909 filed on Feb. 10, 2022. The contents of those applications are incorporated herein by reference in their entireties.

TECHNICAL FIELD

The present disclosure relates to a vehicle antenna device and an antenna module.

BACKGROUND ART

Heretofore, a structure has been known that a casing which stores a substrate on which a plurality of antennas for communication with outside, such as a GNSS (Global Navigation Satellite System) antenna, a V2X (Vehicle to Everything) antenna and a LTE (Long Term Evolution) antenna are mounted, is attached to the inner surface of a vehicle windshield (e.g. Patent Document 1).

PRIOR ART DOCUMENTS

Patent Documents

Patent Document 1: JP-A-2018-067881

DISCLOSURE OF INVENTION

Technical Problem

However, if a satellite antenna such as a GNSS antenna and a communication antenna such as a V2X antenna are mounted on one common substrate, it tends to be difficult to secure isolation between the two antennas and it may sometimes be difficult to secure desired antenna characteristics of the respective antennas, such as antenna gain and directivity. For example, radio waves which the communication antenna transmits/receives to/from outside the vehicle in a horizontal direction, may interfere with radio waves which arrive from a satellite in a zenith direction, thus impairing the antenna characteristics of the satellite antenna and the communication antenna.

The present disclosure provides a vehicle antenna device which can secure desired antenna characteristics of both a satellite antenna and a communication antenna, and an antenna module.

Solution to Problem

According to an aspect of the present disclosure, provided is a vehicle antenna device comprising a dielectric plate attached to a vehicle, a conductor plate placed adjacent to the dielectric plate, a satellite antenna disposed below the conductor plate, receiving radio waves which arrive from a satellite through the dielectric plate, and a communication antenna disposed below the satellite antenna, transmitting/receiving radio waves to/from outside the vehicle through the dielectric plate in a horizontal direction, wherein the satellite antenna comprises a radiating conductor which does not overlap the conductor plate from a vertical view, and a ground conductor positioned between the radiating conductor and the communication antenna.

According to another aspect of the present disclosure, provided is an antenna module which can be installed in the vicinity of a conductor plate placed adjacent to a dielectric plate attached to a vehicle, which comprises, in a state where the antenna module is installed in the vicinity of the conductor plate, a satellite antenna disposed below the conductor plate, receiving radio waves which arrive from a satellite through the dielectric plate, and a communication antenna disposed below the satellite antenna, transmitting/receiving radio waves to/from outside the vehicle through the dielectric plate in a horizontal direction, wherein the satellite antenna comprises a radiating conductor which does not overlap the conductor plate from a vertical view, and a ground conductor positioned between the radiating conductor and the communication antenna.

Advantageous Effects of Invention

According to the present disclosure, provided are a vehicle antenna device which can secure desired antenna characteristics of both a satellite antenna and a communication antenna, and an antenna module.

DESCRIPTION OF EMBODIMENTS

Figure 1:
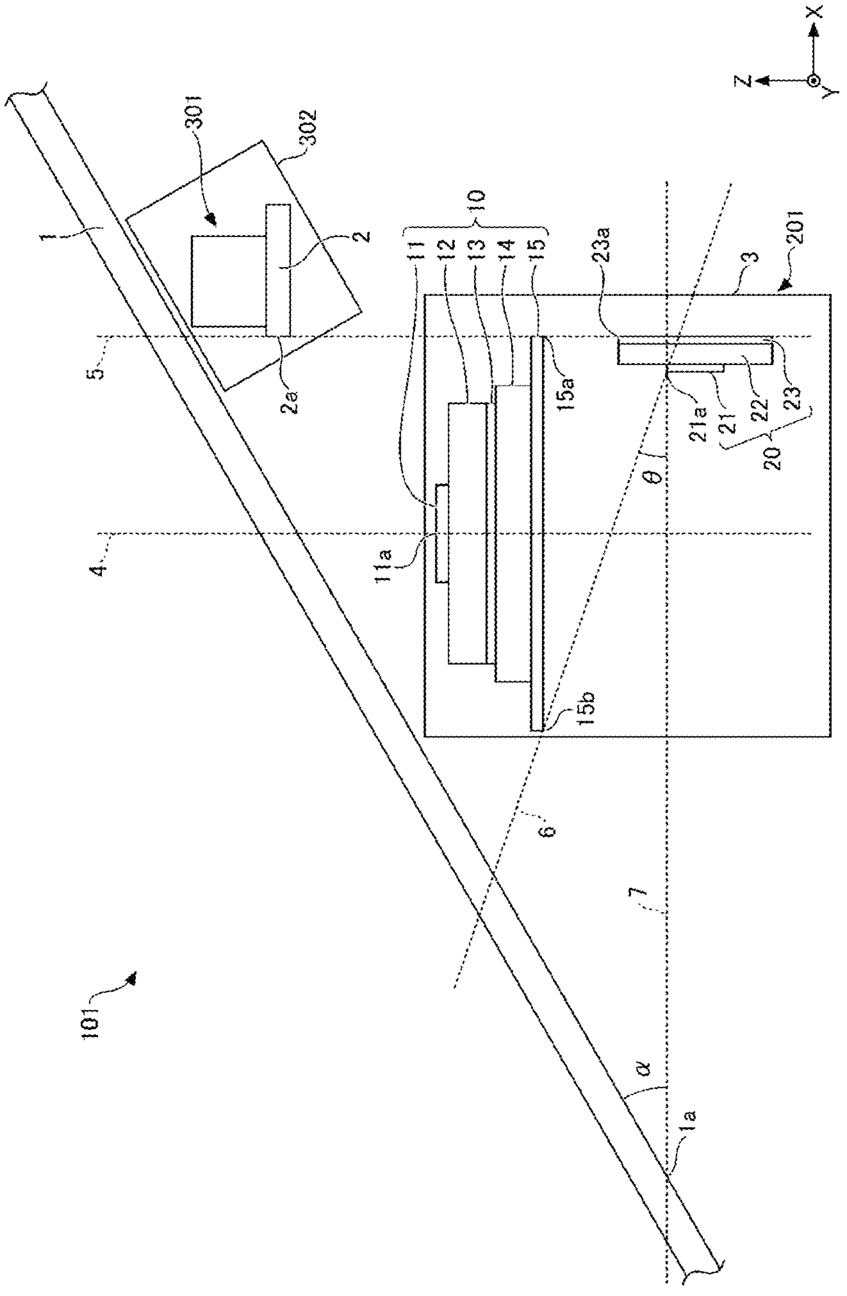
FIG. 1 is a side view illustrating an example of the configuration of a vehicle antenna device according to an embodiment.

Embodiments of the present disclosure will now be described below with reference to the drawings. For easy understanding, the scales of the individual members in the drawings may be represented differently from those of the actual members. Terms representing directions, such as "parallel", "at right angles", "orthogonal", "horizontal", "perpendicular", "top-bottom", and "left-right", are not necessarily to be interpreted in an exact sense, and a certain range of deviation is allowed as long as the operations and the effects of the embodiment are not impaired. The shape of a corner is not limited to a right angle, and the corner may be rounded and arched. The X axis direction, the Y axis direction and the Z axis direction respectively represent a direction parallel to the X axis, a direction parallel to the Y axis and a direction parallel to the Z axis. The X axis direction, the Y axis direction and the Z axis direction are orthogonal to one another. The wording "face" is not limited to a meaning that an object entirely faces another object but may include a meaning that the object partly faces another object, and the wording "overlap" is not limited to a meaning that an object entirely overlap another object but may include a meaning that the object partly overlap another object.

Examples of the window glass of a vehicle in the present embodiment include a windshield attached to the front side of a vehicle, a rear glass attached to the rear side of a vehicle, a side glass attached to the lateral sides of a vehicle, and a roof glass attached to the ceiling of a vehicle. The window glass of a vehicle is not limited to these examples. For example, it may be a window glass having a roof glass integrated with one or both of a windshield and a rear glass.

FIG. 1 is a side view illustrating an example of the configuration of a vehicle antenna device according to an embodiment. An antenna device 101 shown in FIG. 1 is an example of a vehicle antenna device mounted on a vehicle. The antenna device 101 includes a dielectric plate 1 attached to a vehicle, a conductor plate 2 placed adjacent to the dielectric plate 1, and an antenna module 201 installed in the vicinity of the conductor plate 2.

In FIG. 1, the X axis direction, the Y axis direction and the Z axis direction respectively indicate the vehicle front-back direction, the vehicle left-right direction (the vehicle width direction), and the vehicle top-bottom direction. In FIG. 1, the positive side of the X axis direction indicates the vehicle rear side (interior side), and the negative side of the X axis direction indicates the vehicle front side (exterior side). The XY plane is parallel to the horizontal plane, and the Z axis direction corresponds to a vertical direction (a direction perpendicular to the horizontal plane).

The dielectric plate 1 is a plate-shaped member containing a dielectric as the main component. The dielectric may be glass or a resin. Specific examples of the dielectric plate 1, other than a window glass, include a resin window, a resin plate and a resin door. FIG. 1 illustrates a case where the dielectric plate 1 is a window glass (more specifically a windshield).

The dielectric plate 1 may be a transparent (including translucent) member which transmits visible light, or may be a member provided with a light shielding film (not shown) which partially blocks visible light. Specific examples of the light shielding film include a ceramic film such as a black ceramic film. When the antenna module 201 and a housing 302 described hereinafter are disposed so as to overlap the light shielding film from a vertical view from above outside the vehicle, the antenna module 201 and the housing 302 are hardly visible from outside the vehicle, and the design of the vehicle tends to improve.

The conductor plate 2 is a conductive plate-shaped member placed adjacent to the dielectric plate 1. A state where the conductor plate 2 is placed adjacent to the dielectric plate 1, is not limited to a state where it is a certain distance apart from the dielectric plate 1 but includes a state where it is in contact with the dielectric plate 1. The conductor plate 2 is positioned, in the example shown in FIG. 1, on the vehicle interior side relative to the dielectric plate 1, but may be located on the vehicle exterior side relative to the dielectric plate 1. Further, the conductor plate 2 is positioned, in the example shown in FIG. 1, so as to face a main surface of the dielectric plate 1 (the surface on the vehicle interior side in this example), but may be positioned outside the periphery of the dielectric plate 1.

The conductor plate 2 may be a plate member exposed (to the vehicle interior side) or may be a plate member covered with a resin member. FIG. 1 illustrates a state where the conductor plate 2 is covered with a resin-made housing 302. The conductor plate 2 may include a metal plate inside the housing 302 which stores an electronic device 301 which acquires vehicle exterior information. Examples of the metal plate include a bracket which fixes the electronic device 301 to a vehicle body, and a heat radiating plate which releases heat generated in the electronic device 301. The electronic device 301 may include an imaging device which captures an image of the outside of the vehicle. The imaging device acquires information outside the vehicle captured through the dielectric plate 1. The electronic device 301 which acquires the vehicle outside information is not limited to the imaging device but may be another electronic device such as an antenna device which wirelessly acquires vehicle outside information, a rain sensor which detects rain or a sensor which detects the temperature or humidity in the vehicle. Particularly when the electronic device 301 is a device having a plurality of electronic devices including the imaging device integrated, heat control is important and thus a metal heat radiating plate is mounted in many cases.

The conductor plate 2 is not limited to a metal plate stored in the housing 302 and may be another conductive plate-shaped member. For example, the conductor plate 2 may be a plate-shaped portion of a vehicle body frame or a vehicle door, or may be a window frame of e.g. a flange to which a window glass is to be attached.

The antenna module 201 is a module having a plurality of antennas, and is installed in the vicinity of the dielectric plate 1 and the conductor plate 2. The antenna module 201 is disposed in a space on the vehicle interior side relative to the dielectric plate 1, and is fixed by a fixing member (not shown) so that its position relative to the dielectric plate 1 is fixed. The antenna module 201 has a satellite antenna 10 which receives radio waves arriving from a satellite through the dielectric plate 1 and a communication antenna 20 which transmits/receives radio waves to/from outside the vehicle through the dielectric plate 1 in a horizontal direction.

In the antenna device 101, the conductor plate 2, the satellite antenna 10 and the communication antenna 20 are disposed in this order from upper to lower portion of the vehicle. That is, the satellite antenna 10 is disposed below the conductor plate 2, and the communication antenna 20 is disposed below the satellite antenna 10.

The wording "the satellite antenna 10 is disposed below the conductor plate 2" means that the satellite antenna 10 is present in a space between the conductor plate 2 and the vehicle bottom. Thus, the state where the satellite antenna 10 is disposed below the conductor plate 2 is not limited to a state where the satellite antenna 10 does overlap the conductor plate 2 from a vertical view but includes a state where the satellite antenna 10 does not overlap the conductor plate 2 from a vertical view as shown in FIG. 1.

Likewise, the wording "the communication antenna 20 is disposed below the satellite antenna 10" means that the communication antenna 20 is present in a space between the satellite antenna 10 and the vehicle bottom. Thus, the state where the communication antenna 20 is disposed below the satellite antenna 10 is not limited to a state where the communication antenna 20 does overlap the satellite antenna 10 from a vertical view as shown in FIG. 1 but includes a state where the communication antenna 20 does not overlap the satellite antenna 10 from a vertical view.

The satellite antenna 10 has, in this example, a radiating conductor 11 the normal direction of which faces upward and a ground conductor 15 the normal direction of which faces upward. The radiating conductor 11 and the ground conductor 15 are disposed in this order from upper to lower portion of the vehicle.

The radiating conductor 11 does not overlap the conductor plate 2 from a vertical view. Thus, radio waves arriving from a satellite in a zenith direction will hardly be blocked by the conductor plate 2, and the radiating conductor 11 can receive the radio waves with high gain with desired directivity.

The ground conductor 15 is positioned between the radiating conductor 11 and the communication antenna 20. The ground conductor 15 being positioned between the radiating conductor 11 and the communication antenna 20 means that the ground conductor 15 is present in a space between the radiating conductor 11 and the communication antenna 20. In other words, the ground conductor 15 is present in a position which crosses a line segment connecting an optional point on the radiating conductor 11 and an optional point on a radiating plate 21 of the communication antenna 20.

By the ground conductor 15 being positioned between the radiating conductor 11 and the communication antenna 20, the ground conductor 15 functions as a means to secure isolation between the satellite antenna 10 and the communication antenna 20. Therefore, interference between radio waves which the communication antenna 20 transmits/receives to/from outside the vehicle in a horizontal direction, and radio waves which arrive from a satellite in a zenith direction, is suppressed, and thus the antenna characteristics of the satellite antenna 10 and the communication antenna 20 can be secured.

The satellite antenna 10 is, for example, a patch antenna in which the dielectric layer is interposed between the radiating conductor and the ground conductor. In the example shown in FIG. 1, the satellite antenna 10 is a patch antenna having the radiating conductor 11, a dielectric layer 12, a radiating conductor 13, an insulating layer 14 and the ground conductor 15. The form of the satellite antenna 10 may be a form different from that of a patch antenna.

The radiating conductor 11 is a first radiating element which receives radio waves in a first frequency band arriving from a satellite, and the radiating conductor 13 is a second radiating element which receives radio waves in a second frequency band arriving from a satellite. The second frequency band is a frequency band different from the first frequency band. For example, in a case where the satellite antenna 10 is a GNSS antenna, the first frequency band is a 1.2 GHz band including a frequency of L5 waves, and the second frequency band is a 1.6 GHz band including a frequency of L1 waves.

The radiating conductor 11 and the radiating conductor 13 are radiating elements differing in the size, and in this example, the radiating conductor 13 is larger than the radiating conductor 11. The radiating conductor 11, 13 may, for example, be a planar rectangular conductor pattern which receives circularly polarized waves, but the shape of the radiating conductor 11, 13 is not limited thereto. For example, when the radiating conductor 11, 13 has an oblique truncation on two corners on a diagonal of the rectangular conductor, only one feeding point to be connected to the radiating conductor 11, 13 is necessary. The truncation corresponds to a known degeneracy removal element or perturbation element, and the area of the truncation removed from the rectangular conductor is set as an area determined by degeneracy removal method. The satellite antenna 10 may have such a configuration that it has only one of the radiating conductor 11 and the radiating conductor 13. For example, in a case where the satellite antenna 10 is a GNSS antenna, it may be an antenna which can receive only the above first frequency band (1.2 GHz band) or may be an antenna which can receive only the above second frequency band (1.6 GHz band). In such a case, the satellite antenna 10 may have only one of the dielectric layers 12 and 14, and have one radiating conductor, one dielectric layer and the ground conductor 15 laminated from above.

The dielectric layer 12 is a dielectric interposed between the radiating conductor 11 and the radiating conductor 13. The dielectric layer 12 is, for example, a dielectric substrate having a front surface on which the radiating conductor 11 is formed and a rear surface on which the radiating conductor 13 is formed. The radiating conductor 11 is formed substantially at the center portion on the front surface of the dielectric layer 12, and the radiating conductor 13 is formed on almost the entire rear surface of the dielectric layer 12. Specific examples of the dielectric layer 12 include a ceramic substrate.

The insulating layer 14 is an insulator interposed between the radiating conductor 13 and the ground conductor 15. The insulating layer 14 is, for example, a base formed e.g. by a resin.

The ground conductor 15 is a base board which is larger in area than the insulating layer 14. The ground conductor 15 has a larger area than the radiating conductor 13.

The radiating conductor 11 and the radiating conductor 13 are electrically connected to one end of a signal line of a feeding cable such as a coaxial cable, and the ground conductor 15 is electrically connected to a ground wire of the feeding cable. The other end of the signal line is connected to a receiving device which processes signals output from the satellite antenna 10.

The satellite antenna 10 is, for example, a GNSS antenna. The GNSS (Global Navigation Satellite System) generically means satellite positioning system such as GPS of the United States, Quasi-Zenith Satellite System (QZSS) of Japan, GLONASS of Russia, Galileo of Europe, BeiDou of China, and NAVIC of India. The satellite antenna 10 is not limited to a GNSS antenna, and may be an antenna to be used for Satellite Digital Audio Radio Service (SDARS) or low earth orbit satellite communication.

The communication antenna 20 is, for example, a patch antenna in which the dielectric layer is interposed between the radiating conductor and the ground conductor. In the example shown in FIG. 1, the communication antenna 20 is a patch antenna having the radiating plate 21, a dielectric layer 22 and a ground plate 23. The communication antenna 20 may have a form different from a patch antenna, and may be a slot antenna.

The radiating plate 21 is a radiating element which transmits/receives radio waves in a third frequency band to/from a communication device outside the vehicle. The third frequency band at which the radiating plate 21 of the communication antenna 20 conduct transmitting/receiving, may or may not overlap the first frequency band at which the radiating conductor 11 of the satellite antenna 10 conduct transmitting/receiving, or the second frequency band at which the radiating conductor 13 of the satellite antenna 10 conduct transmitting/receiving. The radiating plate 21 is, for example, a planar rectangular conductor pattern which transmits/receives vertically polarized waves or horizontally polarized waves, but the shape of the radiating plate 21 is not limited thereto.

The dielectric layer 22 is a dielectric interposed between the radiating plate 21 and the ground plate 23. The dielectric layer 22 is, for example, a dielectric substrate having a front surface on which the radiating plate 21 is formed and a rear surface on which the ground plate 23 is formed. The radiating plate 21 is formed substantially at the center portion on the front surface of the dielectric layer 22, and the ground plate 23 is formed on almost the entire rear surface of the dielectric layer 22. Specific examples of the dielectric layer 12 include a ceramic substrate.

The ground plate 23 is a conductor plate which is the same in area as the radiating plate 21 or larger in area than the radiating plate 21.

The radiating plate 21 is electrically connected to one end of a signal line of a feeding cable such as a coaxial cable, and the ground plate 23 is electrically connected to a ground wire of the feeding cable. The other end of the signal line is connected to a communication device which processes signals input/output from/to the communication antenna 20. Further, the communication antenna 20 may have one or more parasitic conductor plates (not shown) apart from the radiating plate 21 and the ground plate 23. For example, on a surface of the dielectric layer 22, shared with the radiating plate 21, two parasitic conductor plates in total in the vehicle width direction (+Y axis direction, −Y axis direction) apart from the radiating plate 21, may be provided. When the communication antenna 20 has the parasitic conductor plate, the antenna gain in the vehicle width direction in the horizontal plane improves, and directivity in a wide range is likely to be obtained.

The third frequency band at which the communication antenna 20 conduct transmitting/receiving is, for example, a radio frequency band of microwaves and millimeter waves (0.3 GHz to 300 GHz, for example), for example. Specific examples of the third frequency band include sub6 band (3.6 GHz to 6 GHz, for example), 2.4 GHz band, 5.2 GHz band, 5.3 GHZ band, 5.6 GHz band, 5.8 GHz band, and 5.9 GHZ band.

As the communication antenna 20, for example, a V2X (Vehicle to Everything) antenna, which is used for vehicle-to-vehicle communication and vehicle-to-road communication, is suitably used. The V2X antenna is capable of transmitting and receiving radio waves of a narrowband, such as a 5.8 GHz band and a 5.9 GHz band, for example, and is developed for various applications, such as the European ETC (Electronic Toll Collection) system. The communication antenna 20 is not limited to a V2X antenna and may be an antenna which can be used for other applications such as 5G, 6G, and vehicle radar system.

The communication antenna 20 may, as shown in FIG. 1, be disposed on the conductor plate 2 side relative to an imaginary plane 4 which passes the center of gravity 11*a* of the radiating conductor 11 of the satellite antenna 10 and which is parallel to the radiating conductor 11. The imaginary plane 4 faces the dielectric plate 1. By the communication antenna 20 being disposed on the conductor plate 2 side relative to the imaginary plane 4, as compared with a state in which the communication antenna 20 is disposed on the opposite side of the imaginary plane 4 from the conductor plate 2, the communication antenna 20, the conductor plate 2 and the radiating conductor 11 of the satellite antenna 10 are closer to one another. As they are closer to one another, the antenna device 101 can be made small in size. The imaginary plane 4 corresponds to the YZ plane in this example.

An end 15*a* on the conductor plate 2 side of the ground conductor 15 of the satellite antenna 10, and an end 23*a* on the conductor plate 2 side of the conductor of the communication antenna 20, may be on one vertical plane 5 corresponding to the YZ plane, whereby the communication antenna 20 and the satellite antenna 10 are positioned closer to the conductor plate 2, and thus the antenna device 101 can be made smaller in size. The end 23*a* may be an upper end of the ground plate 23 or a portion at the same potential as the ground plate 23. The portion at the same potential as the ground plate 23 is, for example, a ground terminal of a connector to which one end of a coaxial cable is to be connected. The end 23*a* on the conductor plate 2 side of the conductor of the communication antenna 20 may be positioned on the +X axis direction (the vehicle interior side) as compared with the disposition shown in FIG. 1, and the vertical plane 5 may be disposed so as to pass the end 15*a* on the conductor plate 2 side of the ground conductor 15 of the satellite antenna 10 and the upper end 21*a* of the radiating plate 21. In this case also, the antenna device 101 can be made smaller in size.

The communication antenna 20 is, for example, a patch antenna having the radiating plate 21 the normal direction of which extends at an angle within ±5° relative to the horizontal plane and the ground plate 23 which faces the conductor plate 2 side of the radiating plate 21. In this case, as compared with a form in which the normal direction of the radiating plate 21 extends (is inclined) at an angle exceeding ±5° relative to the horizontal direction, the angle at which radio waves transmitted from the communication antenna 20 in the horizontal direction are reflected on the ground conductor 15 of the satellite antenna 10 becomes smaller. As a result, the radio waves around the normal of the radiating plate 21 tend to be intense, and the communication antenna 20 can transmit/receive radio waves with high gain to/from outside the vehicle through the dielectric plate 1 in the horizontal direction. In a case where the communication antenna 20 is a V2X antenna, according to the communication standards, the normal direction (the angle of elevation or the angle of depression) of the radiating plate 21 may optionally be adjusted within a range of +5°.

The angle θ which is formed by a straight line 6 connecting the upper end 21*a* of the radiating plate 21 and an end 15*b* of the ground conductor 15 on the opposite side from the conductor plate 2, with a reference plane 7 which passes the upper end 21*a* of the radiating plate 21 and which is perpendicular to the radiating plate 21, may be 10° or greater. When the angle θ is 10° or greater, radio waves around the normal of the radiating plate 21 tend to be intense, and the communication antenna 20 can transmit/receive radio waves with high gain to/from outside the vehicle through the dielectric plate 1 in the horizontal direction. In order that the communication antenna 20 can transmit/receive radio waves with high gain in the horizontal direction, the angle θ is preferably 12° or greater, more preferably 15° or greater, further preferably 20° or greater.

The dielectric plate 1 may be inclined relative to the horizontal plane, or may be parallel to the horizontal plane. The dielectric plate 1 inclined relative to the horizontal plane is, for example, a window glass (more specifically a windshield) inclined at an angle α of greater than 0° and 50° or smaller relative to the horizontal plane. The angle α formed by the dielectric plate 1 and the horizontal plane may be 40° or smaller, and may be 30° or smaller. The angle α may be 10° or greater, may be 15° or greater, and may be 20° or greater. The dielectric plate 1 parallel to the horizontal plane (the dielectric plate 1 with an angle α substantially equal to 0) is, for example, a roof glass.

The satellite antenna 10 and the communication antenna 20 may be stored in one housing 3, or may be stored in separate housings. When they are stored in one housing 3, the antenna module 201 can be made small in size.

FIGS. 2 to 5 are top views illustrating an example of the disposition of the vehicle antenna device (antenna device 101A to 101D) according to the embodiment. FIGS. 2 to 5 illustrate variations of the relation between the satellite antenna 10, the communication antenna 20 and the conductor plate 2 from a vertical view.

Figure 2:
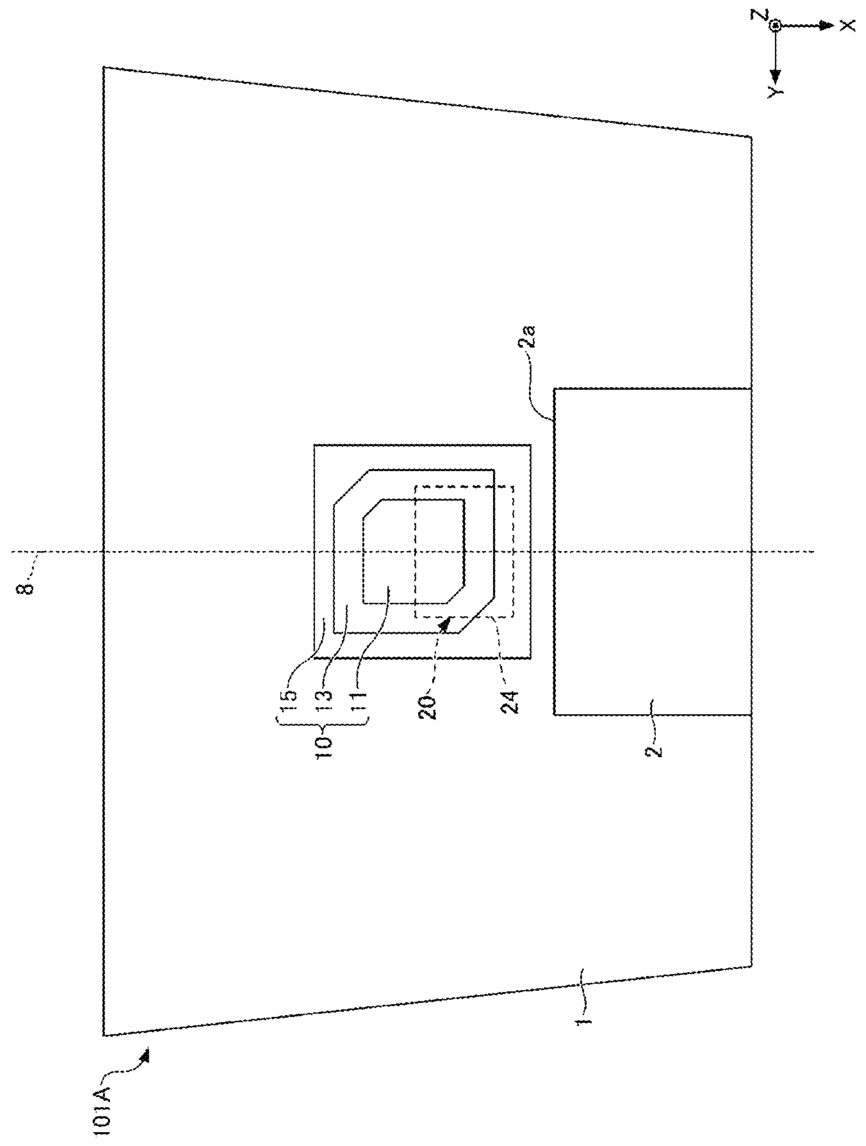
FIG. 2 is a top view illustrating a first example of the disposition of a vehicle antenna device according to an embodiment.
Figure 3:
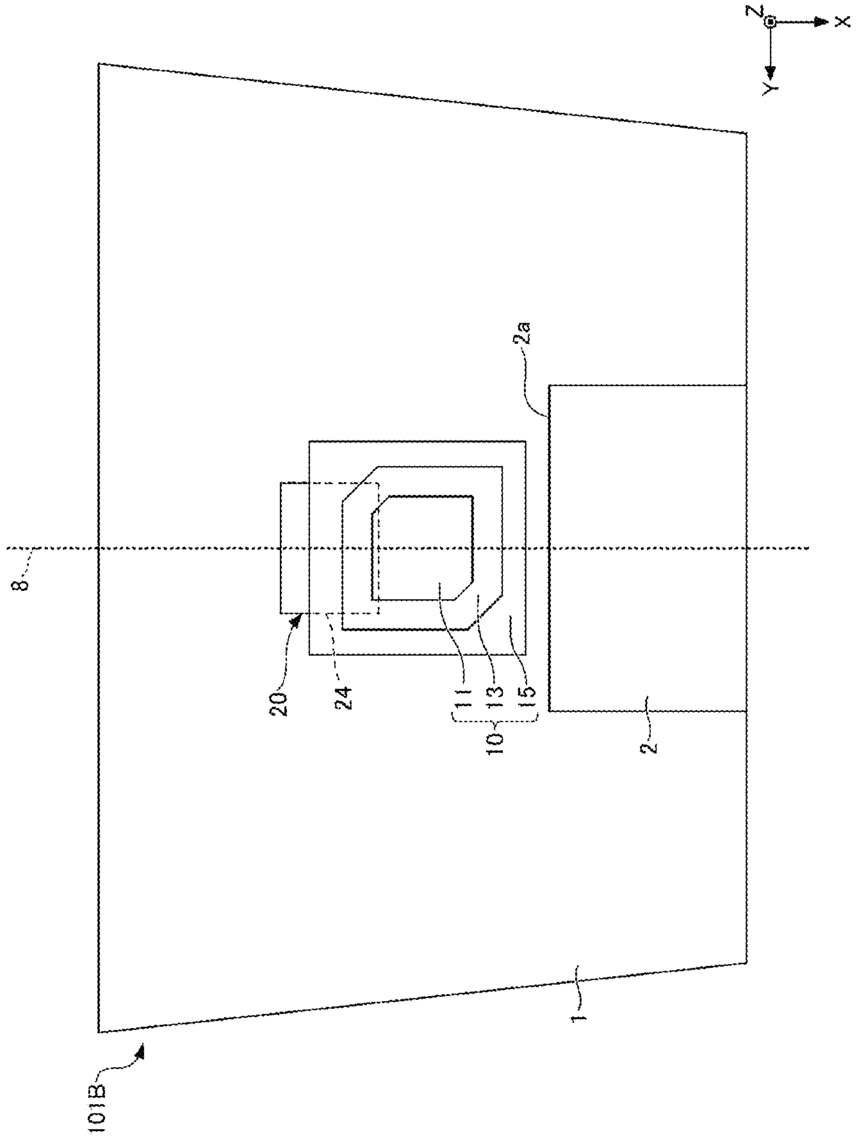
FIG. 3 is a top view illustrating a second example of the disposition of a vehicle antenna device according to an embodiment.
Figure 4:
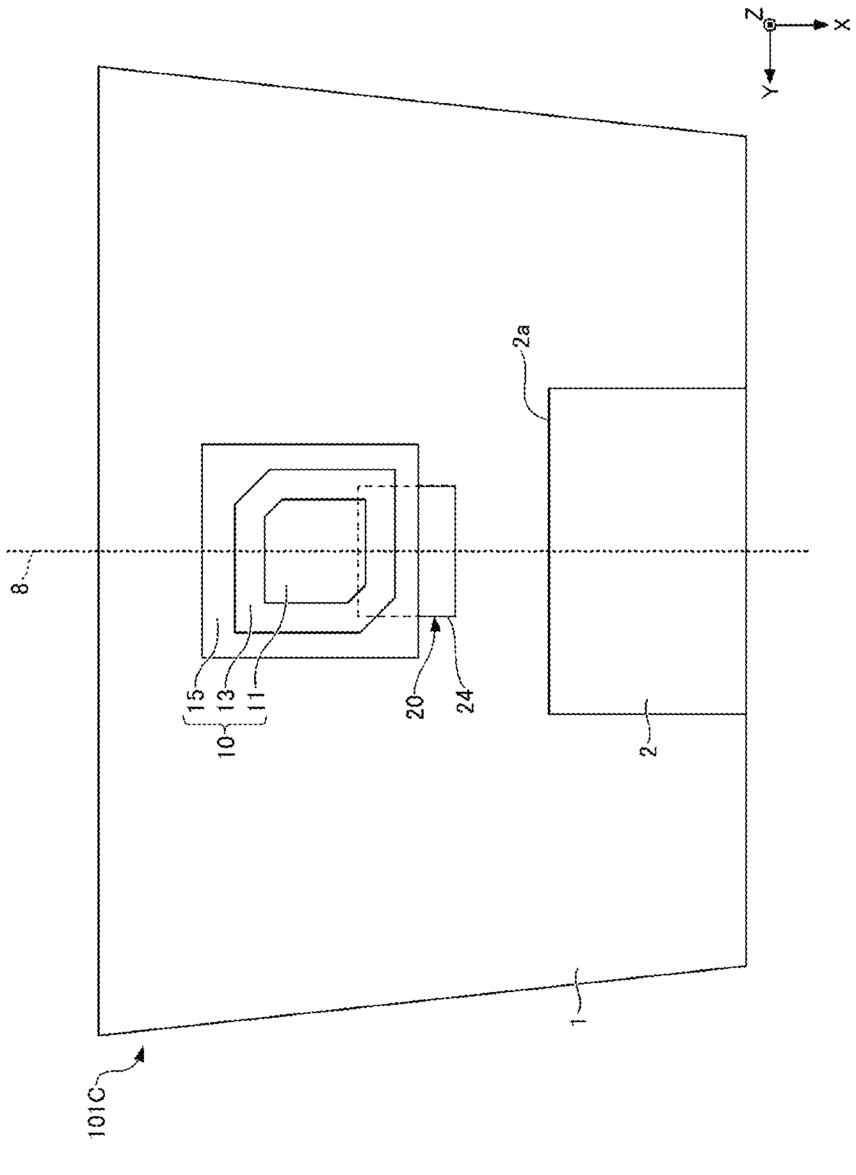
FIG. 4 is a top view illustrating a third example of the disposition of a vehicle antenna device according to an embodiment.
Figure 5:
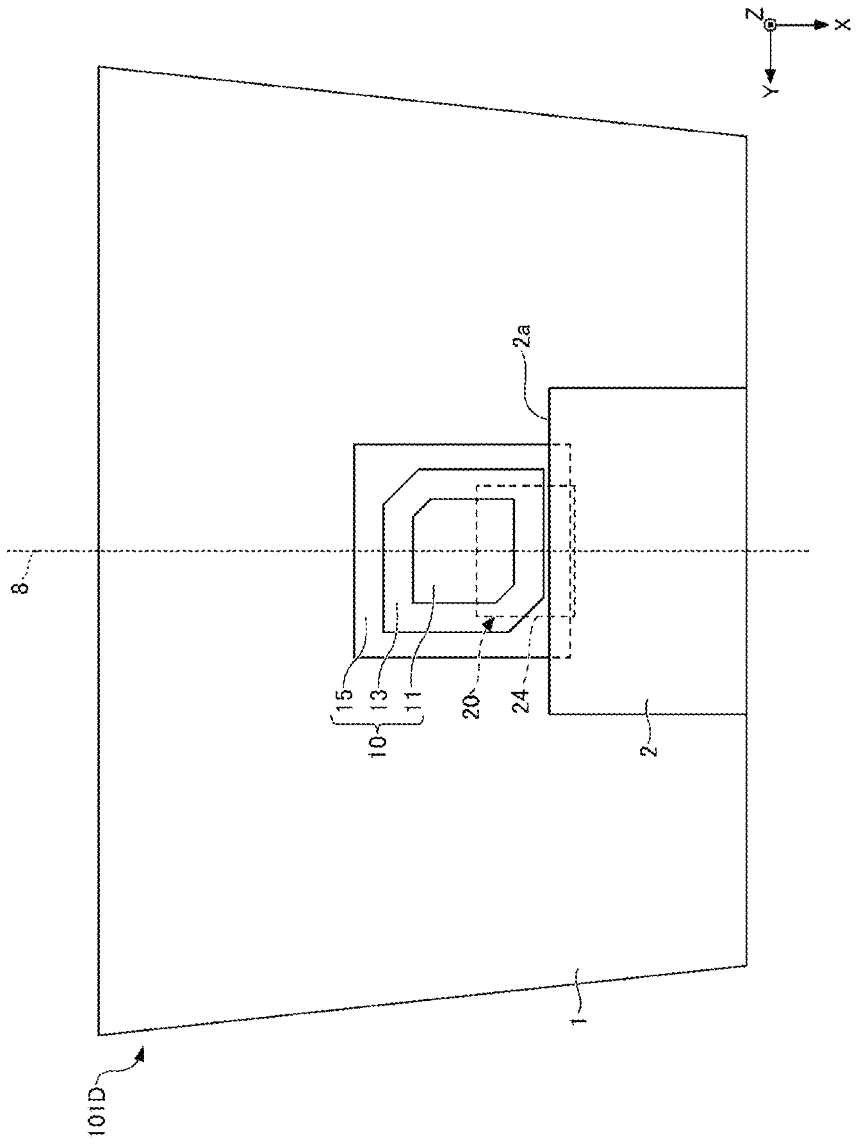
FIG. 5 is a top view illustrating a fourth example of the disposition of a vehicle antenna device according to an embodiment.

As shown in FIGS. 2 to 4, when the conductor plate 2 does not overlap the radiating conductor 13 and the ground conductor 15 from a vertical view, radio waves arriving at the radiating conductor 11, 13 from a satellite will hardly be blocked by the conductor plate 2, whereby the satellite antenna 10 can receive the radio waves with high gain with desired directivity, and the antennal characteristics of the satellite antenna 10 can be secured. The conductor plate 2 may overlap the ground conductor 15 while it does not overlap the radiating conductor 13 from a vertical view, as shown in FIG. 5. In such a form also, a decrease of the antenna gain of the satellite antenna 10 can be suppressed, and the antenna characteristics of the satellite antenna 10 can be secured.

As shown in FIGS. 2 to 5, the communication antenna 20 may include a conductor 24 which overlap at least one of the radiating conductor 11, the radiating conductor 13 and the ground conductor 15 from a vertical view. More preferably, the conductor 24 may overlap the radiating conductor 11, the radiating conductor 13 and the ground conductor 15 from a vertical view. In such a case, as compared with a case where the conductor 24 overlaps none of the radiating conductor 11, the radiating conductor 13 and the ground conductor 15, the satellite antenna 10 and the communication antenna 20 are positioned closer to each other, and thus the antenna device 101A to 101D can be made small in size. The conductor 24 of the communication antenna 20 may be the above-described radiating plate 21 or ground plate 23, may be a parasitic conductor plate (not shown) or may be a portion at the same potential as the ground plate 23.

As shown in FIGS. 2 to 5, the conductor plate 2, the satellite antenna 10 and the communication antenna 20 may overlap one vertical plane 8 substantially orthogonal to the dielectric plate 1. The vertical plane 8 is an imaginary plane orthogonal to the horizontal plane and in this example corresponds to the XZ plane. By the conductor plate 2, the satellite antenna 10 and the communication antenna 20 overlapping one vertical plane 8, the outer dimensions in the Y axis direction can be shortened, and the antenna device and the antenna module can be made small in size. The vertical plane 8 is, for example, a plane which passes the center in the width direction of the vehicle.

The conductor plate 2, the satellite antenna 10 and the communication antenna 20 may not overlap one vertical plane 8. For example, two of the conductor plate 2, the satellite antenna 10 and the communication antenna 20 may overlap one vertical plane 8, and the other one does not overlap the one vertical plane 8. For example, the satellite antenna 10 may be positioned on the positive side of the Y axis direction relative to the vertical plane 8 so as not to overlap the vertical plane 8, and the communication antenna 20 may be positioned on the negative side of the Y axis direction relative to the vertical plane 8 so as not to overlap the vertical plane 8.

Figure 6:
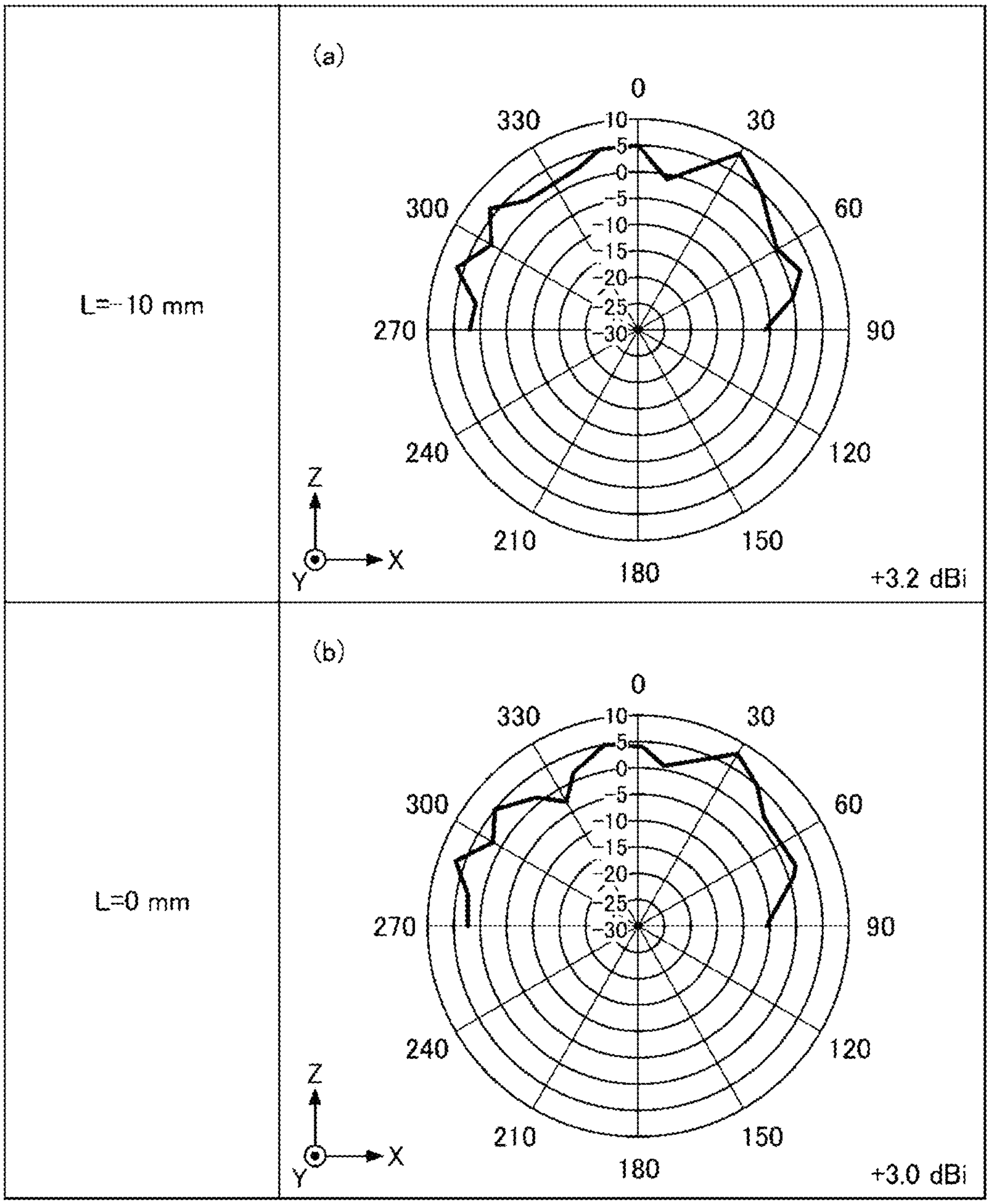
FIG. 6 is a diagram illustrating an example of results of measurement of the directivity of a satellite antenna.

FIG. 6 is a diagram illustrating an example of results of measurement of the directivity of the satellite antenna 10 which receives L1 waves at 1575.42 MHZ (right-handed circularly polarized waves) in the embodiment shown in FIG. 1 in which the dielectric plate 1 is a windshield. The overlap amount L shown in FIG. 6 indicates the distance in the X axis direction between an end 2*a* of the conductor plate 2 and the end 15*a* of the ground conductor 15 in FIG. 1. A case where L is a positive value indicates a case where the end 15*a* is positioned on the positive side of the X axis direction relative to the YZ plane which passes the end 2*a*. A case where L is 0 indicates a case where the end 15*a* is positioned on the YZ plane which passes the end 2*a*. A case where L is a negative value indicates a case where the end 15*a* is positioned on the negative side of the X axis direction relative to the YZ plane which passes the end 2*a*.

The upper hemisphere average gain of the satellite antenna 10 was measured at +3.2 dBi when L=−10 mm, and was measured at +3.0 dBi when L=0 mm. That is, in a case where the satellite antenna 10 deviated 10 mm from the conductor plate 2 into the negative side of the axis direction (vehicle front side) (L=−10 mm), as compared with a case where the satellite antenna 10 did not deviate (L=0 mm), radio wave shielding by the conductor plate 2 decreased, and the antenna characteristics of the satellite antenna 10 improved.

Figure 7:
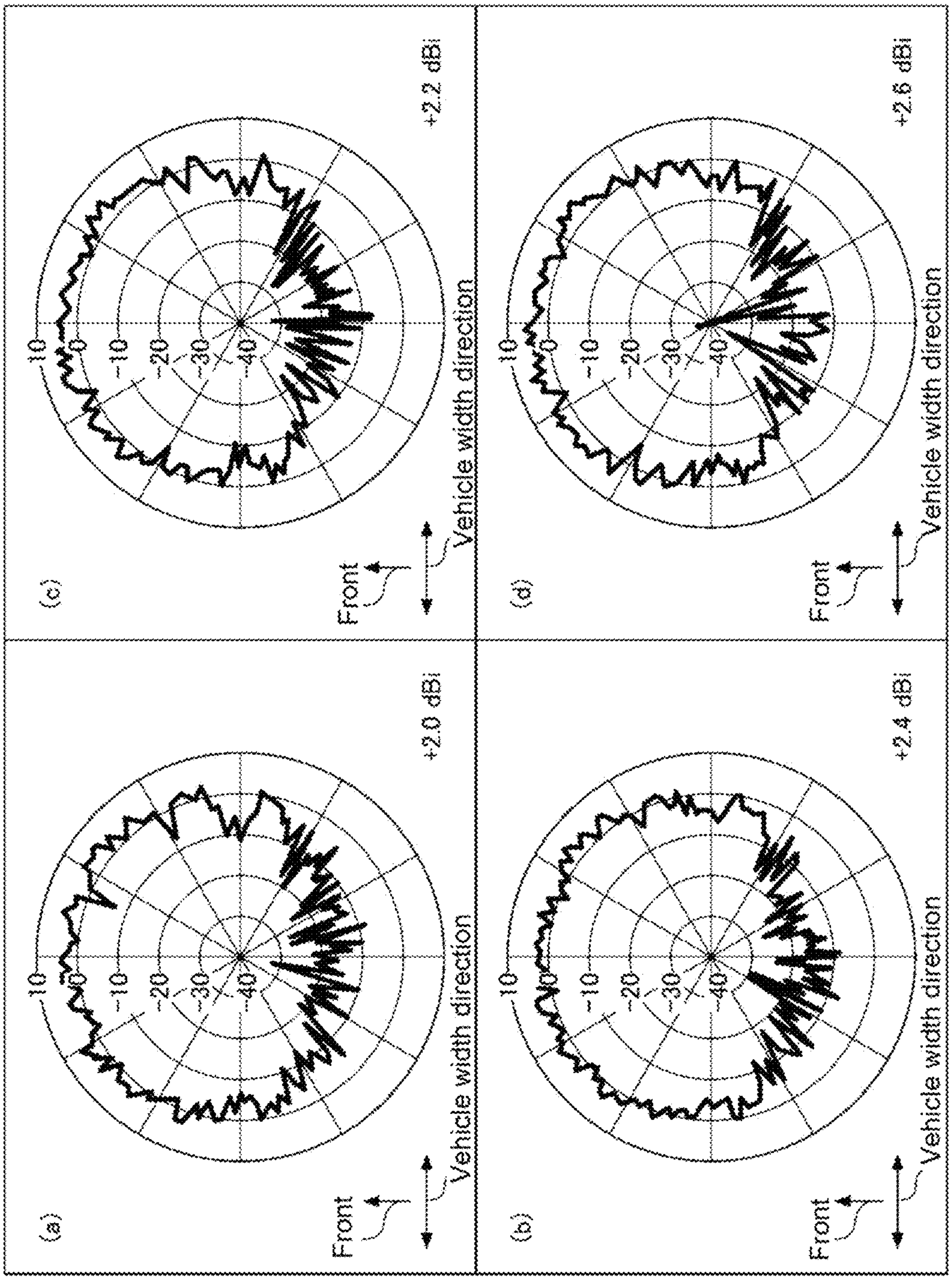
FIG. 7 is a diagram illustrating an example of results of measurement of the directivity of a communication antenna.

FIG. 7 is a diagram illustrating an example of results of measurement of the directivity of the satellite antenna 20 which receives vertically polarized waves at 5850 MHz in the embodiment shown in FIG. 1 in which the dielectric plate 1 is a windshield. FIG. 7 illustrates the directivity at a plane inclined 10° relative to the horizontal plane (XY plane) which passes the center of gravity of the radiating plate 21, that is a plane with an angle of elevation of +10°. At the time of measurement in FIG. 7, the radiating plate 21 is disposed along the YZ plane parallel to the vertical direction, and the vertical plane 5 shown in FIG. 1 is defined as a vertical plane which passes the end 2*a* of the conductor plate 2. In FIG. 1, the intersection point of the reference plane 7 and the dielectric plate 1 is defined as an intersection point 1*a*.

In the embodiment shown in FIG. 1, in the communication antenna 20, two parasitic conductor plates (not shown) which were apart in the +Y axis direction and in the −Y axis direction relative to the radiating plate 21, were provided on the main surface of the dielectric layer 22 shared with the radiating plate 21. As the parasitic conductor plate, a rectangular conductor plate having the long side in the Z axis direction and the short side in the Y axis direction, from a view in the X axis direction of the communication antenna 20, was disposed.

FIG. 7(*a*) corresponds to the embodiment shown in FIG. 1 in which no satellite antenna 10 is disposed and the communication antenna 20 is positioned toward the back of the vehicle. The measurement conditions in FIG. 7(*a*) were as follows.

Horizontal distance from the radiating plate 21 to the intersection point 1*a:* 176 mm Horizontal distance from the vertical plane 5 to the ground plate 23: −2 mm (the ground plate 23 was on the vehicle front side relative to the vertical plane 5)

FIG. 7(*b*) corresponds to the embodiment shown in FIG. 1 in which the satellite antenna 10 is disposed and the communication antenna 20 is positioned toward the back of the vehicle. The measurement conditions in FIG. 7(*b*) were as follows.

Horizontal distance from the radiating plate 21 to the intersection point 1*a:* 176 mm Horizontal distance from the vertical plane 5 to the ground plate 23: −2 mm (the ground plate 23 was on the vehicle front side relative to the vertical plane 5)

Horizontal distance from the vertical plane 5 to the end 15*a* of the ground conductor 15: 10.4 mm (the end 15*a* was on the vehicle rear side relative to the vertical plane 5)

Horizontal distance from the vertical plane 5 to an end of the radiating conductor 13: −12 mm (the end of the radiating conductor 13 was on the vehicle front side relative to the vertical plane 5)

Angle θ formed by a straight line connecting the upper end 21*a* of the radiating plate 21 and the end 15*b* of the ground conductor 15, with the horizontal plane: 20°

FIG. 7(*c*) corresponds to the embodiment shown in FIG. 1 in which no satellite antenna 10 is disposed and the communication antenna 20 is positioned toward the front of the vehicle. The measurement conditions in FIG. 7(*c*) were as follows.

Horizontal distance from the radiating plate 21 to the intersection point 1*a:* 126 mm Horizontal distance from the vertical plane 5 to the ground plate 23: −52 mm (the ground plate 23 was on the vehicle front side relative to the vertical plane 5)

FIG. 7(*d*) corresponds to the embodiment shown in FIG. 1 in which the satellite antenna 10 is disposed and the communication antenna 20 is positioned toward the front of the vehicle. The measurement conditions in FIG. 7(*d*) were as follows.

Horizontal distance from the radiating plate 21 to the intersection point 1*a:* 126 mm Horizontal distance from the vertical plane 5 to the ground plate 23: −52 mm (the ground plate 23 was on the vehicle front side relative to the vertical plane 5)

Horizontal distance from the vertical plane 5 to the end 15*a* of the ground conductor 15: 10.4 mm (the end 15*a* was on the vehicle rear side relative to the vertical plane 5)

Horizontal direction from the vertical plane 5 to the end of the radiating conductor 13: −12 mm (the end of the radiating conductor 13 was on the vehicle front side relative to the vertical plane 5)

Angle θ formed by a straight line connecting the upper end 21*a* of the radiating plate 21 and the end 15*b* of the ground conductor 15, with the horizontal plane: 72°

The average gain around the entire periphery of a plane inclined 10° relative to the horizontal plane which passes the center of gravity of the radiating plate 21, was measured at +2.0 dBi in FIG. 7(*a*) and was measured at +2.4 dBi in FIG. 7(*b*). In FIG. 7(*b*), radio waves were reflected on the ground conductor 15 of the satellite antenna 10 and the radio waves around the normal of the radiating plate 21 tended to be intense, and thus the antenna characteristics of the communication antenna 20 improved as compared with FIG. 7(*a*) without ground conductor 15.

The average gain around the entire periphery of a plane inclined 10° relative to the horizontal plane which passes the center of gravity of the radiating plate 21, was measured at +2.2 dBi in FIG. 7(*c*) and was measured at +2.6 dBi in FIG. 7(*d*). In FIG. 7(*d*), radio waves were reflected on the ground conductor 15 of the satellite antenna 10 and the radio waves around the normal of the radiating plate 21 tended to be intense, and thus the antenna characteristics of the communication antenna 20 improved as compared with FIG. 7(*c*) without ground conductor 15.

The present invention has been described with reference to the above-mentioned embodiments, however, the technique of the present disclosure is not limited to the above-mentioned embodiments. Various changes and modifications such as combination and replacement with other embodiments partly or entirely are possible.

REFERENCE SYMBOLS

1: dielectric plate
2: conductor plate
2*a*: end
3: housing
4: imaginary plane
5: vertical plane
6: straight line
7: reference plane
8: vertical plane
10: satellite antenna
11: radiating conductor
11*a*: center of gravity
12: dielectric layer
13: radiating conductor
14: insulating layer
15: ground conductor
15*a*, 15*b*: end
20: communication antenna
21: radiating plate
21*a*: upper end
22: dielectric layer
23: ground plate
23*a*: end
24: conductor
101, 101A, 101B, 101C, 101D: antenna device
201: antenna module
301: electronic device
302: housing
α, θ: angle

What is claimed is:

1. A vehicle antenna device comprising a dielectric plate attached to a vehicle, a conductor plate placed adjacent to the dielectric plate, a satellite antenna disposed below the conductor plate, receiving radio waves which arrive from a satellite through the dielectric plate, and a communication antenna disposed below the satellite antenna, transmitting/receiving radio waves to/from outside the vehicle through the dielectric plate in a horizontal direction, wherein the satellite antenna comprises a radiating conductor which does not overlap the conductor plate from a vertical view, and a ground conductor positioned between the radiating conductor and the communication antenna.

2. The vehicle antenna device according to claim 1, wherein the conductor plate does not overlap the radiating conductor and the ground conductor from a vertical view.

3. The vehicle antenna device according to claim 1, wherein the communication antenna has a conductor which overlaps at least one of the radiating conductor and the ground conductor from a vertical view.

4. The vehicle antenna device according to claim 3, wherein the conductor of the communication antenna overlaps the radiating conductor and the ground conductor from a vertical view.

5. The vehicle antenna device according to claim 1, wherein the dielectric plate is inclined relative to the horizontal plane.

6. The vehicle antenna device according to claim 1, wherein the communication antenna is disposed on the conductor plate side relative to an imaginary plane which passes the center of gravity of the radiating conductor, which is vertical to the radiating conductor and which faces the dielectric plate.

7. The vehicle antenna device according to claim 6, wherein an end on the conductor plate side of the ground conductor, and an end on the conductor plate side of the conductor of the communication antenna, are on one vertical plane.

8. The vehicle antenna device according to claim 1, wherein the conductor plate includes a metal plate in a housing storing an electronic device which acquires vehicle outside information.

9. The vehicle antenna device according to claim 8, wherein the metal plate is a heat radiating plate which releases heat generated in the electronic device.

10. The vehicle antenna device according to claim 8, wherein the electronic device includes an imaging device which captures an image of the outside the vehicle.

11. The vehicle antenna device according to claim 1, wherein the communication antenna is a patch antenna having a radiating plate the normal direction of which extends at an angle within ±5° relative to the horizontal plane and a ground plate which faces the conductor plate side of the radiating plate.

12. The vehicle antenna device according to claim 11, wherein the angle θ which is formed by a straight line connecting an upper end of the radiating plate and an end on the opposite side of the ground conductor from the conductor plate, with a reference plane which passes the upper end of the radiating plate and which is perpendicular to the radiating plate, is 10° or greater.

13. The vehicle antenna device according to claim 1, wherein the dielectric plate is a window glass.

14. The vehicle antenna device according to claim 13, wherein the window glass is inclined at an angle of 0° or greater and 50° or smaller relative to the horizontal plane.

15. The vehicle antenna device according to claim 1, wherein the satellite antenna is a GNSS antenna.

16. The vehicle antenna device according to claim 1, wherein the communication antenna is a V2X antenna.

17. The vehicle antenna device according to claim 1, wherein the satellite antenna and the communication antenna are stored in one housing.

18. The vehicle antenna device according to claim 1, wherein the conductor plate, the satellite antenna and the communication antenna overlap one vertical plane which is substantially orthogonal to the dielectric plate.

19. The vehicle antenna device according to claim 18, wherein the vertical plane is a plane which passes a center in a width direction of the vehicle.

20. An antenna module which can be installed in the vicinity of a conductor plate placed adjacent to a dielectric plate attached to a vehicle, which comprises, in a state where the antenna module is installed in the vicinity of the conductor plate, a satellite antenna disposed below the conductor plate, receiving radio waves which arrive from a satellite through the dielectric plate, and a communication antenna disposed below the satellite antenna, transmitting/receiving radio waves to/from outside the vehicle through the dielectric plate in a horizontal direction, wherein the satellite antenna comprises a radiating conductor which does not overlap the conductor plate from a vertical view, and a ground conductor positioned between the radiating conductor and the communication antenna.

* * * * *